United States Patent [19]

Miller et al.

[11] Patent Number: 4,542,183

[45] Date of Patent: * Sep. 17, 1985

[54] FATIGUE CRACK GROWTH RETARDANT MATERIAL

[75] Inventors: Robert N. Miller, Acworth; Richard L. Smith, Atlanta, both of Ga.

[73] Assignee: Lockheed Corporation, Burbank, Calif.

[*] Notice: The portion of the term of this patent subsequent to Apr. 27, 1999 has been disclaimed.

[21] Appl. No.: 481,402

[22] Filed: Apr. 1, 1983

[51] Int. Cl.$^4$ .................. C08K 5/16; C08L 63/00; C08L 81/04

[52] U.S. Cl. .................. 524/714; 523/456; 524/718; 524/720; 524/722; 524/724; 524/881; 528/374

[58] Field of Search ............... 524/260, 881, 714, 724; 528/374

[56] References Cited

U.S. PATENT DOCUMENTS

| | | | |
|---|---|---|---|
| 2,537,982 | 1/1951 | Finn | 524/260 |
| 2,933,470 | 4/1960 | Sorg | 524/881 |
| 3,022,870 | 2/1962 | John | 524/881 |
| 3,046,248 | 7/1962 | Molnar | 524/881 |
| 3,247,138 | 4/1966 | Jorzak | 524/881 |
| 3,499,864 | 3/1970 | Millen | 524/881 |
| 3,607,845 | 9/1971 | Ireland | 524/881 |
| 3,659,896 | 5/1972 | Smith | 524/881 |
| 3,801,517 | 4/1974 | Richwein | 524/451 |

*Primary Examiner*—C. Warren Ivy
*Attorney, Agent, or Firm*—Eric R. Katz

[57] ABSTRACT

A fatigue crack growth retardant material for application to aluminum and alloys thereof utilizes certain organic nitrogen compounds and an elastomeric polymer compatible herewith with respect to the curing properties thereof as well as the ultimate properties of the material and capable of stabilizing the nitrogen compound so as to inhibit the evaporation thereof to the atmosphere. The material inhibits corrosion of and retards crack growth in aluminum and alloys thereof when applied thereto. The material has particular utility when applied to the surfaces of structural parts of aircraft and is utilized as a protective coating as well as a sealant, dependent upon the amount of solvent added to the polymeric elastomer.

3 Claims, No Drawings

FATIGUE CRACK GROWTH RETARDANT MATERIAL

TECHNICAL FIELD

The present invention generally relates to fatigue crack growth retardants for metals and more particularly to a fatigue crack growth retardant material for inhibiting corrosion of and retarding crack growth in aluminum and alloys thereof.

Current standards for aircraft structural integrity require that airframe structural cracking be controlled within specific limits defined by such considerations as durability, safety, inspectability, and feasibility of repair. Because fatigue crack growth is a function of cyclic stress history and chemical/thermal environmental factors, the load that will produce deleterious crack growth is considerably less in moist or corrosive environments, such as found in coastal regions or industrially polluted areas, than in less corrosive environments. Thus, accelerated fatigue cracks can result in the premature failure of well designed structures.

Heretofore, paint systems have been employed to isolate structural parts from the environment. These paint systems utilize known corrosion inhibitors and are relatively impermeable to the diffusion of moisture. However, such protective paints are of no effect once a crack is initiated and the base metal is exposed.

BACKGROUND ART

Crack retardants are known; however, the prior art disclosures on the use of such known retardants typically require the continuous exposure of the crack path to solutions containing the retardant. The known retardants are of little use when applied to an aircraft because there is no liquid to carry the retardant to the crack tip and fracture surfaces.

In an effort to eliminate the shortcomings of the known crack retardants, the inventors of the present invention disclosed, in U.S. Pat. No. 4,327,152 to Miller et al., assigned to the assignee of the present invention, a protective coating for retarding crack growth in aluminua alloys which requires no liquid to convey the retardant to the fracture surface and at the tip of the advancing crack. The protective coating disclosed by the above-noted patent utilizes a volatile crack growth retardant having a high vapor pressure so that the vapor from the retardant reacts with the surface of the metal to form a protective film. The retardant is blended with a primer, such as an organic paint, and this crack growth retardant reinforced primer is, preferably, covered with a low-permeability organic film so as to prevent the loss of the volatile retardant to the atmosphere.

While the protective coating of Miller et al. overcomes many of the deficiencies of the known crack retardants, there are some drawbacks. The reaction product of hexafluoroisopropanol and cyclohexylamine is very volatile and therefore should be used in conjunction with a low-permeability film as a topcoat in order to prevent loss of the retardant to the atmosphere by evaporation and insure a long-life protective coating. The use of a topcoat is not always desirable or feasible. On the one hand, the topcoat adds weight to the overall load that the aircraft must overcome in order to fly and on the other hand, it is undesirable to apply a topcoat in certain applications, for example, fastener installations.

In studies of actual aircraft structures after periods of normal service, it has been found that approximately 92% of fatigue cracks originate in fastener holes. In order to prevent the passage of moisture and the environment as well as to prevent leaks in pressurized areas, it is customary for most of the fasteners to be installed coated with a liquid sealant which subsequently cures as a tough elastomeric material.

In an attempt to discover a long-life fatigue crack growth retardant for use on fasteners, Miller and Smith tried several less volatile crack retardants which were used to modify the reaction product of hexafluoroisopropanol and cyclohexylamine, hereinafter referred to as the L-8 material. The modified L-8 material was mixed with an elastomeric polymer which happened to be a polysulfide. Much to their surprise Miller and Smith learned that the addition of the modified L-8 material to the polysulfide caused a chemical reaction which stabilized the retardant and made it less volatile. This result was quite unexpected in that one of ordinary skill in the art would expect that the polysulfide polymer, during its curing operation, would have used all the available reaction sites, none being available to react with the modified L-8 material. During further experimentation, it was discovered that the L-8 material could be stabilized by an elastomeric polymer, for example a polysulfide, without the necessity for a less volatile additive.

DISCLOSURE OF THE INVENTION

It is, therefore, an object of the present invention to provide a retardant material for inhibiting corrosion of and retarding crack growth in aluminum and alloys thereof which has a long-lifetime durability.

Another object of the present invention is to provide a fatigue crack growth retardant material which can be utilized as a protective coating as well as a sealant.

One advantage of the present invention is that there is provided a fatigue crack growth retardant material which omits the need for a low-permeable topcoat while retaining the function of a fatigue crack growth retardant.

In accordance with these and other advantages, features and objects of the present invention, there is provided a fatigue crack growth retardant material for application to aluminum and alloys thereof comprising an amine compound having at least two —NH$_2$ groups and an elastomeric polymer compatible with the compound with respect to the curing properties thereof as well as the ultimate properties of the retardant material and capable of stabilizing the compound so as to prevent the evaporation thereof to the atmosphere whereby the retardant material inhibits corrosion of and retards crack growth in aluminum and alloys thereof when applied thereto.

In accordance with the present invention there is provided a fatigue crack growth retardant material wherein the amine compound comprises a cyclic amine compound such as the reaction product of hexafluoroisopropanol and cyclohexylamine mixed in a 1 to 1 molar ratio, the product being mixed with an elastomer , such as a polymeric organic material of a polysulfide nature, in a concentration of approximately 5% by weight.

In an alternate form of the invention, the proposed fatigue crack growth retardant material comprises a mixture of the reaction product of hexafluoroisopropanol and cyclohexylamine mixed in a 1 to 1 molar ratio and a diamine, the retardant material being formed by adding approximately 4% by weight of the reaction product and approximately 4% by weight of the diamine to 92% by weight of an elastomeric polymer.

In accordance with the present invention the diamine comprises dimethyl piperazine, or triethylene diamine.

BEST MODE FOR CARRYING OUT THE INVENTION

The fatigue crack growth retardant compounds contemplated for use with the present invention are amine-type compounds which have two or more —NH$_2$ groups in the molecular structures. Because the —NH$_2$ groups have two available electrons in the outer shell of the nitrogen atoms, these compounds readily combine with aluminum or aluminum oxide. The preferred compounds, specifically, the reaction product of hexafluoroisopropanol and cyclohexylamine, hereinafter referred to as the L-8 material, dimethyl piperazine, triethylene diamine, and mixtures thereof were selected for their effectiveness in controlling general corrosion as well as for their ability to retard the rate of fatigue cracking in aluminum.

The fatigue crack growth retardant material of the present invention can be employed as a coating or a sealant. This is accomplished by blending one of the crack retardant compounds listed above with an elastomeric polymer, the viscosity of which determines the ultimate function of the material. Therefore, the material of this invention is applied to an aircraft or aircraft part by the conventional methods of sealant injection or brushing or alternatively, it can be thinned with a solvent and applied by spraying.

According to one embodiment of the present invention it is proposed herein to employ such crack growth retardant compounds as noted above by blending with an elastomeric polymer, which is an organic paint, i.e. a polymeric organic material mixed with a solvent to facilitate its application in the form of a thin film over a substrate or metal. The primer is one which is compatible with the selected retardant compound with respect to the curing properties thereof as well as the physical properties of the ultimate coating and capable of stabilizing the retardant so as to inhibit the evaporation thereof to the atmosphere. Preferably, the primer is a polysulfide, such as MIL-P-87112 polysulfide which is obtainable from Products Research and Chemical Corporation, 2919 Empire Avenue, Burbank, Calif. 91504 under the company designation PR-1432GP.

According to this embodiment of the present invention, approximately 5%, i.e. between about 4% and 6%, by weight of the amine compound is added to the primer which is a polysulfide material. The amine compound is, preferably, a cyclic amine, having two or more NH$_2$ groups, such as the reaction product of hexafluoroisopropanol and cyclohexylamine mixed in a 1 to 1 molar concentration, this reaction product hereinafter being referred to as the L-8 material.

The preferred method of mixing the retardant compound with the primer is to calculate the amount of retardant compound needed to make approximately a 5% by weight formulation. The correct weight of retardant compound is then dissolved in just enough methyl ethyl ketone, or any other suitable solvent to dissolve it completely. All mixing operations are done at room temperature, i.e. about 75° F. (23.9 Celsius).

The polysulfide primer noted above is a two-part system, i.e., composed of a base material and a catalyst. The catalyst is added to the base material and thoroughly mixed. The methyl ethyl ketone containing the dissolved L-8 material is then mixed with the primer. However, if a one part system primer is employed, the corrosion retardant dissolved in the methyl ethyl ketone is blended directly into the primer. The ultimate coating is applied to the aircraft or aircraft part by the conventional methods of spraying or brushing.

The need for a low-permeability organic film as a topcoat to prevent the loss of the retardant compound to the atmosphere is eliminated when the primer is a polysulfide because the retardant compound reacts with the primer and becomes a part of the molecular structure. This is a completely unexpected development because the polysulfide polymer has only a limited number of available sites for reaction and crosslinking and theoretically, the curing agent reacts and occupies all of these sites. Because the L-8 material becomes a part of the molecular structure, it will not diffuse to the surface and volatilize is a short time, thus eliminated the need for the low permeability topcoat and thereby providing a long-life crack growth retardant protective coating.

Comparative Test Data

The following tests were conducted to determine if the L-8 material reacts with PR-1432GP polysulfide and with MIL-P-23377 epoxy polyamide primer during the cure period.

Two hundred grams of catalyzed PR-1432GP polysulfide primer, with and without 5%, by weight, of the L-8 material was monitored for viscosity changes during the cure cycle with a Brookfield Viscosimeter. This instrumentment measures the drag produced when a stainless steel spindle is rotated at a constant speed. Through the use of appropriate factors, the drag records are converted to centipoise viscosity units. Table I summarizes the results obtained. During the test, the temperature was constant at 22° C.

TABLE I

Effect of L-8 Material on Cure Rate of PR-1432 GP Polysulfide

| Time (Min.) | Viscosity (Centipoises) | |
|---|---|---|
| | Without L-8 material | With L-8 material |
| 0 | 2650 | 8750 |
| 15 | 2925 | 8900 |
| 30 | 3100 | 16800 |
| 45 | 3520 | 16800 |
| 60 | 3950 | 400,000 |

The results illustrate that the viscosity of the PR-1432 GP polysulfide primer was increased as soon as the L-8 material was added. The cure rate was also significantly accelerated.

Table II shows the effect of adding 5% by weight of the L-8 material to MIL-P-23377 epoxy polyamide primer.

TABLE II

Effect of L-8 Material on Cure Rate of MIL-P-23377 Epoxy Polyamide Primer

| Time (Min.) | Viscosity (Centipoises) | |
|---|---|---|
| | Without Inhibitor | With Inhibitor |
| 0 | 25 | 25 |
| 30 | 25 | 25 |
| 60 | 25 | 25 |
| 90 | 25 | 25 |
| 120 | 25 | 25 |
| 180 | 25 | 25 |

The data in Table II shows no change in viscosity as the result of adding the L-8 inhibitor to the epoxy polyamide primer. The overall results indicate that the L-8 inhibitor reacts with the polysulfide, but does not react with the epoxy polyamide primer, thus confirming the fact that the reaction of the L-8 material was unexpected. The effectiveness of the L-8 material as a crack retardant is clearly demonstrated by the Comparative Test Data disclosed in U. S. Pat. No. 4,327,152, the entire disclosure being herein incorporated by reference.

Tests were conducted in order to determine which amine compounds exhibited superior protection against general corrosion. The results of these tests are detailed herein below.

Tests for Effectiveness Against General Corrosion

Potentiostatic polarization tests were performed by immersing 7075-T6 aluminum specimens, $\frac{1}{4}''$ in diameter and 3/4" long, in $3\frac{3}{4}\%$ NaCL solution containing 1000 ppm of the test retardants. The 7075-T6 alloy was selected because it is the most corrosion-prone of the high strength alloys. A retardant which effectively prevents corrosion for this alloy will be even more effective in protecting the more corrosion-resistant aluminum alloys. Potentiodynamic scans were made with a Princeton Applied Research Model 350 corrosion measurement unit.

Table III summarizes the test results with the 7075-T6 aluminum. In some cases low corrosion rates were obtained by the specimens were coated with a dark film. The most promising retardant of those evaluated was dimethyl piperazine. It produced a corrosion rate of only 3.74 mils per year and the specimen remained bright and untarnished.

TABLE III

Corrosion Test of New Retardants

| RETARDANT | CORROSION RATE (Mils/Year) | APPEARANCE |
|---|---|---|
| 1. 3,5 Dinitrobenzoic Acid | 5.85 | Dark |
| 2. Nitrobenzoic Acid | 3.73 | Dark |
| 3. Hexamethyleneimine | 5.61 | Dark |
| 4. Dimethylamine | 3.51 | Dark |
| 5. Dicyclohexylamine | 4.42 | Dark |
| 6. Phenylanthranylic Acid | 6.12 | Dark |
| 7. Dimethyl Piperazine | 3.74 | Bright & Shining |
| 8. Cupferron | 5.72 | Mottled |
| 9. Biphenyl Dimethyl Triazine | 32.45 | Dark |
| 10. Triethylene Diamine | 12.12 | Bright & Shining |

To determine which of the amine compounds exhibited superior crack retardant capabilities, the following tests were conducted, the results being detailed herein below.

Crack Growth Tests

The effectiveness of the retardants in slowing crack growth was determined by placing the test compounds in Petri dishes sealed against the crack path on 7075-T73 aluminum fatigue specimens. There was no direct contact between the retardants and the crack path. The selected retardants were volatile enough to react with the surface of the cracks through vapor phase contact. A cotton swab saturated with water was enclosed in the Petri dish with the test retardant to ensure 100% relative humidity conditions. The center-cracked 7075-T73 aluminum fatigue specimens were 4.0 inches wide, 0.10 inch thick, and 28 inches long. Three through-the-thickness center slots were cut in each specimen by an electrical discharge machining process. The specimens were precracked until a crack of 0.03 inches was present on each side of the slot. The specimens were cycled between loads of 1,000 to 4,000 pounds at a frequency of 0.2 Hz in an electrohydraulic fatigue testing machine. All tests were conducted at a temperature of 70° F.

Table IV tabulates the data recorded regarding the Crack Length vs Stress Cycles. Dimethyl piperazine and triethylene diamine were the most effective of the compounds tested.

TABLE IV

| Retardant | Crack Length after 75,000 Cycles |
|---|---|
| None (Control) | 1.54 inches |
| Phenylanthranylic Acid | 1.20 inches |
| Dimethyl Piperazine | 1.04 inches |
| Biphenyl Dimethyl Triazine | 1.40 inches |
| Triethylene Diamine | 1.00 inches |
| Cupferron | 2.00 inches |

In accordance with another embodiment of the present invention, the amine compound comprises a mixture of the reaction product of hexafluoroisopropanol and cyclohexylamine mixed in a 1 to 1 molar ratio and a diamine. The mixture is formed by adding approximately 4% by weight of the reaction product and approximately 4% by weight of the diamine to 92% by weight of a primer, which is, preferably a polysulfide organic paint. The diamine comprises any one of the compounds listed in Table III, however, the preferred embodiment contemplates the use of dimethyl piperazine or triethylene diamine as the diamine.

According to yet another embodiment of the present invention, it is proposed herein to employ the crack growth retardant compounds by blending with a sealant, such as a polysulfide rubber. The sealant is compatible with the selected re-tardant compound with respect to the curing properties thereof as well as the physical properties of the ultimate retardant material and capable of stabilizing the retardant compound so as to inhibit the evaporation thereof to the atmosphere. Preferably, the sealant is a polysulfide such as MIL-S-8802 obtainable from Products Research and Chemical Corporation, 2919 Empire Avenue, Burbank, Calif. 91504 under the company designation PR-1422, respectively. PR-1422 is a two-part, room temperature curing, thixotropic, polysulfide liquid polymer compound with increased soluble chromate content to inhibit corrosion in areas subjected to galvanic action. The polymer is designed for use as a filleting compound for sealing integral fuel tanks and pressurized cabins and is covered by U.S. Pat. Nos. 2,787,608 and 2,964,503. The ultimate material is applied to the aircraft or aircraft part by the conventional methods of sealant injection or brushing.

Because the crack growth retardant compound combines with the polysulfide sealant, the volatile retardant compound will not diffuse to the surface and volatilize in a short time. This is particularly important when the sealant is used for permanently installed fasteners.

In order to demonstrate the effectiveness of the material of the embodiment, the following test data is offered.

Results of Fatigue Tests with Fasteners

A crack growth retardant material was formulated by adding 4% of each of the two best crack growth retardant compounds to MIL-S-8802 polysulfide sealant.

HiLok fasteners, ¼ inch in diameter, were wet installed with sealant in a triple-crack specimen of 7075-T73 aluminum. The protective coating which contained the best combination of retardants (4% dimethyl piperazine and 4% reaction product of hexafluoroisopropanol and cyclohexylamine) was used to install the fastener in the bottom crack. The fasteners in the top and middle cracks were wet installed with a primer which had no special combination of retardants.

After 350,000 cycles between 4000 and 1000 pounds at 0.2 Hz and at ambient conditions of temperature and humidity (80° F., 25% RH) the control cracks had grown more than 1.5 inches while the crack in the fastener protected by the retardant primer was not visible so its growth was less than 0.045 inches.

The foregoing test data clearly shows the superior crack retardant nature and corrosion inhibiting quality of the disclosed material.

We claim:

1. A fatigue crack growth retardant material for application to aluminum and alloys thereof comprising:
   (a) an amine compound comprising the reaction product of hexafluoroisopropanol and cyclohexylamine mixed in a 1 to 1 molar ratio; and
   (b) a polysulfide elastomeric polymer compatible with said compound with respect to the curing properties of said polymer as well as the ultimate properties of said material and capable of stabilizing said compound so as to inhibit the evaportion thereof to the atmosphere, said reaction product being mixed with said polysulfide elastomeric polymer in a concentration of about 5% by weight;

whereby said material inhibits corrosion of and retards crack growth in aluminum and alloys thereof when applied thereto.

2. The material of claim 1, wherein said polysulfide is mixed with a solvent whereby said material is applied as a coating.

3. The material of claim 1, wherein said polysulfide is prepared for application as a sealant.

* * * * *